No. 687,502. Patented Nov. 26, 1901.
G. L. MARKLEY.
HORSESHOE.
(Application filed Feb. 21, 1901.)
(No Model.)
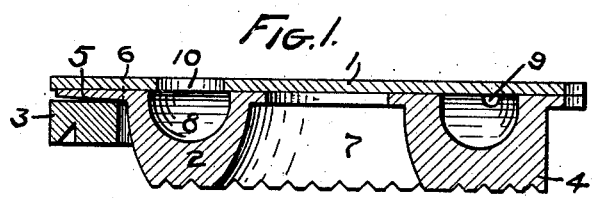
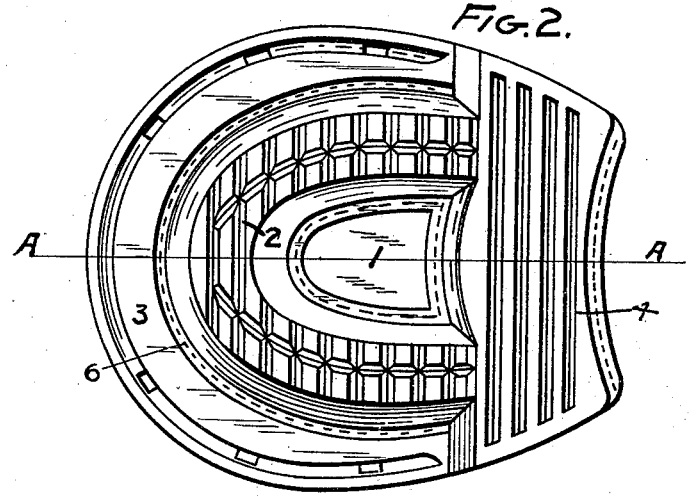
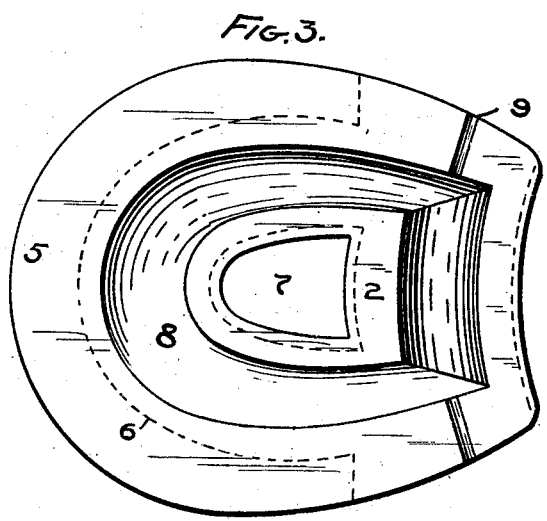
WITNESSES:
G. H. Blaker
Florence E. Bryant
INVENTOR.
George L. Markley
BY
V. H. Lockwood
His ATTORNEY.

UNITED STATES PATENT OFFICE.

GEORGE L. MARKLEY, OF INDIANAPOLIS, INDIANA.

HORSESHOE.

SPECIFICATION forming part of Letters Patent No. 687,502, dated November 26, 1901.

Application filed February 21, 1901. Serial No. 48,229. (No model.)

*To all whom it may concern:*

Be it known that I, GEORGE L. MARKLEY, of Indianapolis, county of Marion, and State of Indiana, have invented a certain new and useful Horseshoe; and I do hereby declare that the following is a full, clear, and exact description thereof, reference being had to the accompanying drawings, in which like numerals refer to like parts.

This invention relates to a cushioned horseshoe with a hollow annular elastic pad just within the metal portion of the shoe and with the central portion of the pad open and a passage-way from the outer air to the hollow portion of the pad and thence to the bottom of the horse's hoof when the horseshoe is secured thereto.

The object of this invention is to avoid ground contact with the central part of the horseshoe or pad and to distribute the pressure as near to the outside or periphery of the horseshoe as possible. One object is also to ventilate thoroughly the horse's hoof and do so by means which is not liable to become closed by dirt.

The full nature of my invention will be understood from the accompanying drawings and the following description and claims.

In the drawings, Figure 1 is a central vertical longitudinal section of my horseshoe on the line A A of Fig. 2. Fig. 2 is a bottom view of the horseshoe. Fig. 3 is a top view of the elastic pad.

In detail, 1 is a piece of leather covering the entire upper surface of the elastic pad 2.

3 is the metal portion of the horseshoe, being made like a metal horseshoe, except the heels thereof, as appears in Fig. 2.

The elastic or rubber pad 2 has a heel portion 4 and a U-shaped forward extension therefrom that is surrounded by the metal portion 3 of the horseshoe. The U-shaped portion of the pad has a horizontal flange 5 extending from it, which is secured to the piece of leather 1 by stitches 6. The parts are secured to the horse's hoof by nails (not shown) that pass through the metal portion 3, the flange 5, and the piece of leather 1. Hence the horse's hoof is relieved from the direct blow of the metal portion 3 on the street-surface by the yielding material between the hoof and metal part of the horseshoe.

The annular form of the elastic pad leaves a large central opening 7, which is closed at the top by the leather piece 1 to keep the dirt from packing between the hoof and horseshoe. The opening 7 prevents the weight of the horse coming upon the central part of the shoe and foot and distributes it to the annular pad just within the metal part of the horseshoe.

The annular pad is made hollow by the air-chamber 8, extending centrally throughout it and entirely around the central opening 7, as appears in Fig. 3. This air-chamber is connected with the outside air by grooves 9 in the upper surface of the pad near the heel. The hole 10 in the piece of leather 1 also affords communication between the air-chamber in the pad and the space between the pad and the hoof. By this the hoof is well ventilated and the air-chamber supplied with air without danger of being closed by dirt.

What I claim as my invention, and desire to secure by Letters Patent, is—

1. An elastic horseshoe-pad adapted to fit within and against the metal horseshoe and extend below the same, with an air-chamber extending annularly throughout said pad and over the tread portion thereof, and a leather covering over said pad.

2. A horseshoe including an annular elastic pad with an air-chamber formed by a recess in the upper side thereof, a leather covering for the top of said pad with a hole through it communicating with said air-chamber, and a passage near the heel of the pad from the air-chamber to the outer air.

In witness whereof I have hereunto affixed my signature in the presence of the witnesses herein named.

GEORGE L. MARKLEY.

Witnesses:
 LAURA HITT,
 V. H. LOCKWOOD.